United States Patent [19]

Mann

[11] Patent Number: 4,576,623
[45] Date of Patent: * Mar. 18, 1986

[54] METHOD FOR MAKING MULTIFOCAL OPHTHALMIC LENS

[75] Inventor: George H. Mann, Corning, N.Y.

[73] Assignee: Corning Glass Works, Corning, N.Y.

[*] Notice: The portion of the term of this patent subsequent to Feb. 12, 2002 has been disclaimed.

[21] Appl. No.: 592,940

[22] Filed: Mar. 23, 1984

[51] Int. Cl.⁴ .............................................. C03C 21/00
[52] U.S. Cl. ...................................... 65/30.14; 65/37; 65/38; 351/168; 351/177
[58] Field of Search ................ 65/37, 38, 39, 30.14; 351/177, 176, 168, 166; 156/99, 101

[56] References Cited

U.S. PATENT DOCUMENTS

| | | | |
|---|---|---|---|
| 1,948,636 | 2/1934 | Tillyer | 351/176 X |
| 2,640,299 | 6/1953 | Sheard et al. | 65/38 |
| 2,958,162 | 11/1960 | Upton | 65/38 X |
| 3,877,798 | 4/1975 | Tolar et al. | 351/168 |
| 3,975,093 | 8/1976 | Upton | 65/38 X |
| 3,997,249 | 12/1976 | Krohn et al. | 351/166 |
| 4,498,919 | 2/1985 | Mann | 65/30.14 X |

FOREIGN PATENT DOCUMENTS 52-10742  1/1977  Japan ................................. 351/168

Primary Examiner—Kenneth M. Schor
Attorney, Agent, or Firm—Kees van der Sterre

[57] ABSTRACT

A laminated multifocal prescription ophthalmic lens is provided comprising a plano (zero power) cap element incorporating a convergent near-vision multifocal segment, the cap being cemented to a prescription-ground single vision base element. The back surface curvature of the base is configured to provide prescribed sphere, cylinder and other vision-corrective refraction characteristics to the laminated lens.

1 Claim, 2 Drawing Figures

METHOD FOR MAKING MULTIFOCAL OPHTHALMIC LENS

BACKGROUND OF THE INVENTION

1. Field of the Invention

The present invention is in the field of prescription lenses for ophthalmic eyewear and particularly relates to a prescription multifocal ophthalmic lens formed by laminating together a multivision lens cap element and a single-vision base element of matching curvature.

2. Description of Prior Art

The technology of manufacturing prescription multifocal ophthalmic lenses in glass is well developed. In conventional practice, a glass lens blank having the form of a thick (>4 mm) spherical meniscus lens with a convex front surface (front meaning facing away from the eye) and a concave back surface is provided. To provide multifocal characteristics in the lens, a near-vision corrective portion or segment is generated in this blank, typically on the blank front surface. Two procedures are commonly employed to generate the near-vision segments. In the first, the curvature of a section of the lens front surface (the lower section with reference to a mounted lens as worn) is increased to provide higher refractive power than the remainder of the lens. This procedure can be used with plastic as well as glass lenses.

In the second procedure, which is most common with glass lenses, the front surface of the glass blank is configured to provide a circular recess or countersink in the lower section of the lens. A small multifocal segment glass element of semicircular shape, composed of a glass with a higher refractive index than that of the blank and shaped to fit the recess, is placed in the recess, together with a second semicircular glass segment sealed to the first segment but composed of a glass matching that of the blank, which fills the remainder of the recess. These segments are then fused or sealed into the recess by heating to form a fused assembly. The front surface of the blank including the fused segments is then ground and polished to a suitable curvature, typically a spherical curvature, to provide the finished front surface of the lens.

The refractive power of this lens is provided by finishing the concave back surface of the semifinished lens to a curvature which differs from that of the front surface curvature. The back surface curvature is made less than that of the front surface or so-called base curve where positive correction is required, or is made greater than that of the front base curve for negative or minus power correction.

In cases where astigmatic correction is required in the lens, some degree of cylindrical curvature is added to the spherical curvature specified for the lens back surface. With this added curvature the radius of curvature of the back surface is made greater in one direction than in directions orthogonal thereto by a specified amount. The direction or axis of minimum back surface curvature, termed the cylinder axis, must be carefully controlled to satisfy each individual prescription.

It is apparent from the foregoing description that the manufacture of a fused prescription multifocal ophthalmic lens is a complex process which because of the large number of variables involved, must necessarily be performed on an individual or customized basis. This means that significant delays can be encountered between the time a prescription is written and the time the prescription ground lenses are delivered.

It is therefore a principal object of the present invention to provide an improved method of manufacture for prescription multifocal ophthalmic lenses in glass.

It is further object of the invention to provide novel glass elements for prescription multifocal ophthalmic lens construction which simplify the dispensing of multifocal ophthalmic prescriptions.

Other objects and advantages of the invention will become apparent from the following description.

SUMMARY OF THE INVENTION

In accordance with the present invention, a prescription multifocal ophthalmic lens is constructed by a lamination process wherein a relatively thin multifocal cap element providing the front surface of the lens is bonded to a relatively thin single-vision prescription base element which provides the back surface of the lens.

The cap element has the configuration of a thin meniscus lens (a convex front surface and a spherically curved concave back surface), and is predominately a zero power (plano) element. Thus it is of uniform thickness over at least a predominant portion of its area, with a thickness preferably not exceeding about 1.5 mm. The cap element does, however, include at least one lens area or lens segment for near-vision correction having positive corrective power and imparting multifocal characteristics to the cap element.

The base element of the lens is a single vision prescription element having a convex, spherically curved front surface with a curvature matching that of the spherical back surface of the cap element. The back surface of the base element is prescription-ground to impart the necessary corrective power and/or cylinder to the lens.

To construct a prescription multifocal ophthalmic lens according to the invention a blank for the cap element is selected and near-vision characteristics are imparted to a selected area of the blank, e.g. by fusing lens segments to the front surface of the lens, or by shaping part of the front surface to provide a near-vision area. The remainder of the front surface is finished to spherical curvature, preferably to a standard diopter base curve used in the industry. The back surface of the cap element is also finished to spherical curvature to match the curvature predominating on the front surface of the lens. The finished thickness of the cap normally does not exceed about 1.5 mm.

A base element for the lens is next provided, the base also having the configuration of a meniscus lens with convex front and concave back surfaces. The front of this base has been finished to a spherical curvature matching that of the back surface of the cap and the back surface of the base is finished to a sphere or sphere-plus-cylinder configuration imparting power and any necessary astigmatic correction to the lens.

To construct the finished lens, the cap is placed on the front surface of the base and the relative positions of the cap and base are adjusted to move the near-vision portion of the cap into a proper position with respect to the optical center of the base, and to rotate the axis of cylinder correction of the base into proper alignment with the near-vision portion of the cap. The two elements are then cemented together. Finally, the cemented combination may be edged to remove excess peripheral glass and to provide a finished prescription multifocal ophthalmic lens of a shape suitable for framing.

DESCRIPTION OF THE DRAWING

The invention may be further understood by reference to the drawing wherein.

DETAILED DESCRIPTION

Figure 1:
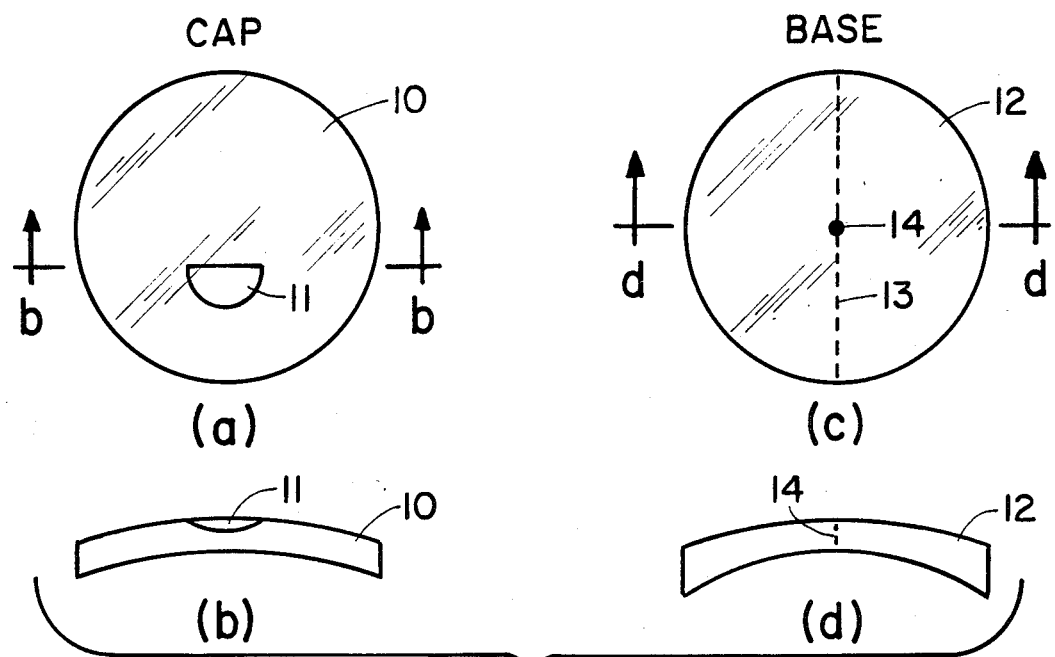
FIG. 1 shows cap and base elements suitable for constructing a prescription multifocal ophthalmic lens according to the invention.

While the invention can be used to fabricate prescription multifocal ophthalmic lenses from essentially any transparent glass or plastic material, the preferred material from the standpoint of durability and scratch-resistance is glass. Similarly, while the invention is applicable to the construction of multifocal lenses with or without cylinder correction for astigmatism, and even with or without power correction, it is most useful in the construction of astigmatism-corrective multifocals since it is for this application that the convenience of being able to provide a prescribed cylinder, cylinder axis, multifocal power and multifocal position in a lens simply by appropriate selection and positioning of base and cap elements is particularly advantageous. Therefore, while not intended to be limiting, the following description of the invention will be with reference to the construction of a prescription multifocal ophthalmic lens in glass, wherein the corrective prescription includes a cylinder correction for astigmatism.

Near-vision correction in glass lenses can be obtained either by changing the front surface curvature of the lens in the near-vision portion, to add refractive power to that portion, or by fusing a near-vision segment into the front surface of the lens, the segment being made of a relatively high index glass for the efficient enhancement of refracting power. Either method can be used for the fabrication of cap elements in accordance with the invention, but the fused segment method is more common and will be referred to further in the following description.

To provide a cap element with near-vision correction in accordance with the invention, a spherical lens blank for the cap is first selected for processing. Such blanks are commercially available in a range of diopter curvatures which are standard in the industry, typically 2–10 diopters, with the most common curves being approximately 4, 6, and 8 diopters.

The selected blank is provided with a circular recess or countersink on its convex front surface which is designed to receive a semicircular near-vision segment glass. In some cases two segments of differing refractive index are used. To prepare a multivision cap, near-vision segments are placed in the recess together with a filler segment to fill the remainder of the recess, and these components are heated to fuse the segment glasses into the blank. The fused assembly is then subjected to a front surface grinding and polishing step to generate a finished spherical surface of optical quality on the front surface of the blank. This finish will be to a precise standard industry base diopter curvature, most commonly 4.25, 6.18 or 8.18 diopters.

Since it is desired that, with the exception of the added near-vision segment, the cap exhibit zero refractive power, the spherical curvature on the concave back surface of the cap will match that of the front surface, i.e., it will be of the same standard base diopter curvature. This standard curve can be generated on the back surface either before or after the finishing of the front surface, and both finishing operations can be used to attain the desired final thickness of the finished cap. This thickness can be the minimum needed to support the multivision characteristics of the cap and to provide adequate handling durability. Preferably the finished thickness will not exceed about 1.5 mm, to avoid undue thickness and weight in the finished lens assembly.

The base element will likewise be of the minimum thickness needed to provide the prescribed vision correction and the demands of physical handling. Because it is ground to provide power and cylinder correction, it will not be of uniform thickness, but will have a minimum thickness at its center or at its edge, depending upon whether plus or minus refractive power is required by the particular prescription to be filled. Minimum thicknesses greater than about 1.5 mm, however, are again not normally required.

With the exception of thickness, the base element can be prepared as a standard single vision ophthalmic lens. The front surface will be ground and polished to a standard base diopter curvature matching that of the cap element, and the back surface will be finished to a different spherical curvature as needed to provide the refractive power required by the prescription, together with added cylindrical curvature for astigmatic correction. Unlike the conventional procedure for multifocal prescription lens grinding, however, back surface grinding and polishing can be carried out without concern as to proper multifocal segment/cylinder axis positioning since this will be fixed during the final assembly of the lens.

The finished prescription multifocal ophthalmic lens is constructed by cementing a multifocal cap element to the front surface of a base element of the same standard diopter curvature, after positioning the cap with respect to the base to provide the proper angular and positional relationship between the multifocal segment on the cap and the cylinder axis or optical center of the base. Conventional glass grinding and polishing equipment used in the ophthalmic industry is capable of reproducing standard base curves to within ±0.05 diopters of the nominal 4.25, 6.18 or 8.18 diopter standard values. This is sufficiently precise that cap and base elements of the same nominal base curve can be permanently cemented together using only a very thin layer of a suitable adhesive. The strength of the resulting bond is sufficient to permit subsequent edging and framing of the lens without undue risk of breakage or delamination.

The cementing of the finished cap element to the base element can be accomplished using any permanent, non-discoloring, transparent glass-bonding adhesive or cement. These are generally one- or two-part curing adhesives, based on epoxy, acrylic, polyurethane or silicone resins. The preferred curing formulations are one part ultraviolet curing adhesives, sold particularly for optical use, which can be ultraviolet-curable acrylic, methane-acrylic or polyurethane adhesives. Using these preferred cements, it is easy to avoid gaseous and particulate inclusions between the cap and base, and to provide only a thin liquid layer which can be quickly and conveniently cured to a high strength, permanent bonding layer.

The invention may be further understood by reference to the following example illustrating the construction of a glass prescription multifocal ophthalmic lens in accordance therewith.

EXAMPLE

A multifocal ophthalmic lens with a power (sphere) correction of −1.00 diopters, a cylinder correction of −0.25 diopters, a cylinder axis of 50°, and a near-vision correction (add) of +1.00 diopters is prescribed. To construct this lens, a cap element such as shown in FIG. 1 of the drawing is first provided. A schematic top view of the cap is shown in FIG. 1(a), and a schematic sectional side view along line b—b of FIG. 1(a) is shown in FIG. 1(b). As shown in these figures, the cap includes spherical lens element 10 which incorporates a multifocal (near-vision) segment 11. Element 10 is made of a standard white crown ophthalmic glass, commercially available as Code 8361 glass with refractive index 1.5230 from Corning Glass Works, Corning, New York 14831. The near-vision segment is composed of Corning Code 8316 glass, likewise commercially available, having refractive index 1.653. This cap element is produced by fusing the near-vision segment 11 onto the front surface of element 10 using standard multifocal fusion techniques, but the fused assembly is finished to a final thickness of approximately 1.3 mm. With the exception of segment 11, the element is of zero power (a so-called plano lens), both front and back surfaces having been finished to a standard 6.18 diopter base curve.

A base element such as schematically shown in FIG. 1 of the drawing is also provided. A schematic top view of the base is shown in FIG. 1(c), and a schematic sectional side view along line d—d of FIG. 1(c) is shown in FIG. 1(d). As shown in these figures, base element 12 is a prescription-ground element finished to provide a minus-power lens, but which also includes cylinder correction as schematically indicated by cylinder axis 13 which passes through optical center 14 of the element. The front surface of the element, to which the cap will be cemented, is finished to a 6.18 diopter base curve. The back surface is finished to a curve of 7.18 diopters (providing −1.00 diopters power correction), but with an added cylinder correction of −0.25 diopters with reference to cylinder axis 13. The minimum center thickness of the base element found at optical center 14, is about 1.3 mm.

Figure 2:
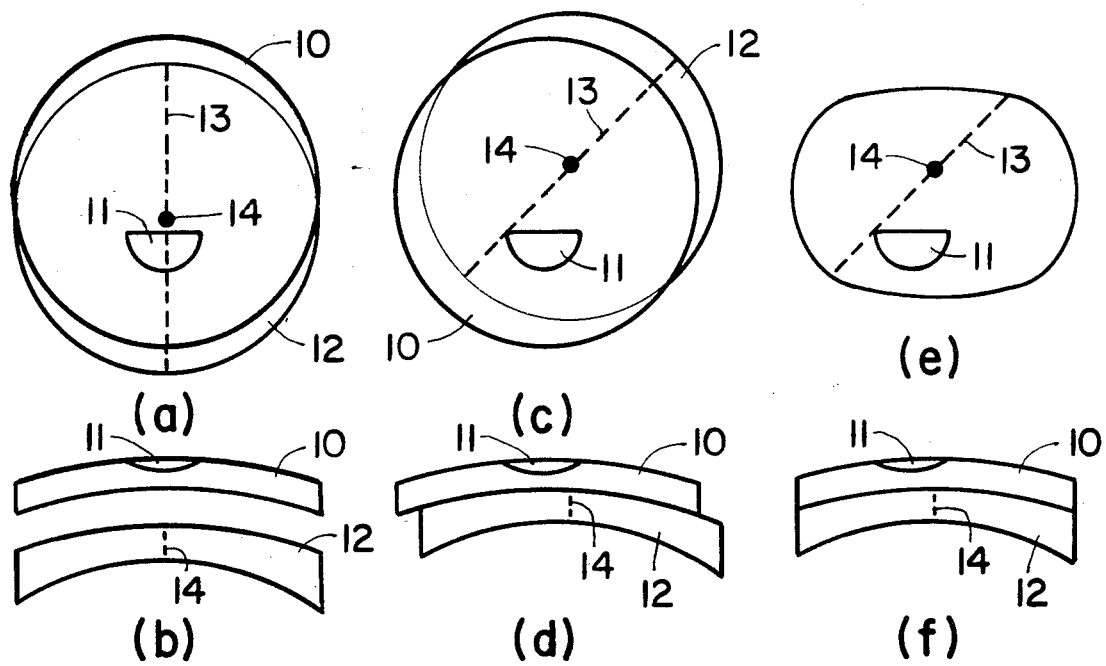
FIG. 2 illustrates a procedure by which such elements may be used to construct a prescription multifocal ophthalmic lens according to the invention.

To construct a finished multifocal lens from cap 10 and base 12, the cap and base are combined according to the procedure schematically illustrated in FIG. 2 of the drawing. Referring to FIGS. 2(a) and 2(b), cap 10 incorporating segment 11 is placed in proximity to the front surface of base 12, that surface having first been provided with a thin layer of an ultraviolet-curing adhesive not shown. The adhesive employed, applied as a liquid, is commercially available as UV 74 ™ adhesive from Summers Laboratory, Inc., Fort Washington, Pa.

As next shown in FIG. 2(c) and 2(d), base 12 is then rotated and aligned with respect to cap 10 to provide the prescribed cylinder axis angle with respect to the base angle of the lens, in this case approximately 50°, and to position multifocal segment 11 appropriately with respect to optical center 14 of prescription base element 12. The cap and base are then placed in contact with each other and the assembly is exposed to an ultraviolet lamp for thirty minutes to cure the adhesive and provide a strongly bonded assembly.

As finally shown in FIGS. 2(e) and 2(f), the assembly is thereafter edge-finished in a conventional manner to provide an appropriately configured multifocal lens for a selected eyeglass frame.

Numerous variations and modifications of the procedure illustrated by the foregoing Example are possible. For example, for best performance in ball drop safety tests such as specified by United States FDA eyeglass regulations, lenses are frequently subjected to strength-enhancing thermal or chemical tempering treatments. Incorporating such treatments into the fabrication process of the present invention normally requires that tempering be carried out on the individual cap and base elements before they are corrected with a final lens.

Most preferably, a chemical (ion-exchange) tempering process will be employed on the separate cap and base lens components after they have been ground, polished and edged. For edging, the lens components can be temporarily bonded in their final alignment with a soluble bonding adhesive such as a pine tar rosin, then edged, and then separated for chemical strengthening prior to final cementing. Conventional ion-exchange strengthening treatments can be employed.

In some cases, it may be desirable to provide a prescription multifocal ophthalmic lens exhibiting photochromic properties, i.e., the capability of darkening when exposed to light and fading in the absence of such light. A preferred approach to the construction of such a lens is to provide the multifocal cap element in photochromic glass. One suitable photochromic glass for such a cap, commercially available from Corning Glass Works in the form of lens blanks in a series of standard base curves, is Corning Code 8111 glass. Other photochromic glasses may alternatively be used.

Processes for forming multifocals in this and other photochromic glasses are well known, as shown for example in U.S. Pat. No. 4,017,292. The production and strengthening of single-vision photochromic cap elements is described in my co-pending, commonly assigned patent application Ser. No. 547,108 now U.S. Pat. No. 4,498,919, filed Oct. 31, 1983, and reference may be made to that application for a further description of photochromic caps.

I claim:

1. A method for making a laminated, chemically strengthened multifocal ophthalmic lens which comprises the steps of:
    (a) selecting a glass blank for a multifocal cap element, the blank consisting of a spherical miniscus lens with a concave back surface and with a convex front surface having a recess into which an ophthalmic multifocal segment glass element has been fused;
    (b) finishing the front and back surfaces of the blank to provide a finished multifocal cap element with front and back surfaces of matching diopter curvature and a finished thickness not exceeding about 1.5 mm;
    (c) providing a glass base element consisting of a spherical miniscus lens with a convex front surface and a concave back surface, the surface curvature of said front surface matching the curvature of the concave back surface of said cap element, and the concave back surface having been ground to provide at least cylinder corrective power about a cylinder axis in the element;
    (d) temporarily bonding the cap element to the base element with a soluble bonding adhesive to provide a bonded composite, the back surface of the cap element being bonded to the front surface of the base element and the relative positions of said elements being adjusted prior to bonding to provide a prescribed angular relationship between the cylinder axis of the base element and the multifocal segment of the cap element;
(e) edging the bonded composite to provide an edge configuration for a selected eyeglass frame;
(f) separating the edged cap and base elements and subjecting the separate cap and base elements to a chemical ion-exchange tempering process to provide strengthened elements; and
(g) permanently cementing the strengthened cap and base elements together to provide a finished laminated, chemically strengthened multifocal ophthalmic lens.

* * * * *